United States Patent [19]

Haruyama et al.

[11] Patent Number: 5,201,060
[45] Date of Patent: Apr. 6, 1993

[54] BASEBAND SIGNAL COMMUNICATION APPARATUS

[75] Inventors: Shinichi Haruyama, Gunma; Fusao Sekiguchi, Tokyo; Yoshikazu Kawashima; Ko Ishikawa, both of Kanagawa, all of Japan

[73] Assignees: Yamatake-Honeywell Co., Ltd.; Yokowo Co., Ltd., both of Japan

[21] Appl. No.: 509,955

[22] Filed: Apr. 16, 1990

[30] Foreign Application Priority Data

Apr. 19, 1989 [JP] Japan .................. 1-99366

[51] Int. Cl.$^5$ .............................................. H04B 7/00
[52] U.S. Cl. .............................. 455/45; 455/61; 455/63
[58] Field of Search ..................... 455/45, 324, 61, 63

[56] References Cited

U.S. PATENT DOCUMENTS

3,860,870  1/1975  Furuya ........................ 455/45
4,561,115  12/1985  Pfeifer ......................... 455/45
4,912,471  5/1990  Tyburski et al. ............. 455/41

Primary Examiner—Reinhard J. Eisenzopf
Assistant Examiner—C. Belzer
Attorney, Agent, or Firm—Blakely, Sokoloff, Taylor & Zafman

[57] ABSTRACT

A baseband signal communication apparatus includes a transmission unit and a reception unit. The transmission unit superposes a subcarrier on one value of a baseband signal consisting of binary values, modulates a carrier with the baseband signal on which the subcarrier is superposed, and transmits the baseband signal as a transmission signal wave. The reception unit demodulates the baseband signal having the subcarrier superposed thereon by using a demodulator upon reception of the transmission signal wave, extracts the subcarrier from the demodulated signal by using a bandpass filter, and demodulates the baseband signal by causing a detector to detect an envelope of the subcarrier.

3 Claims, 8 Drawing Sheets

BASEBAND SIGNAL COMMUNICATION APPARATUS

BACKGROUND OF THE INVENTION

The present invention relates to a baseband signal communication apparatus which can modulate a baseband signal at a high S/N ratio with a simple circuit arrangement.

In a communication system disclosed, e.g., in Japanese Patent Laid-Open No. 56-140486, an interrogation signal wave and an energy wave composed of a carrier for a response signal wave are radio-transmitted from a fixed interrogator to a responsor carried by a user or attached to a moving object by using a microfrequency. Upon reception of these waves, the responsor converts the energy wave into an operation power and is operated. At the same time, the responsor modulates the carrier for a response signal wave with a response signal corresponding to the interrogation signal and radio-transmits the response signal wave to the interrogator with a weak electric field strength. In this communication system, interrogation and response signals are radio-transmitted as baseband signals having binary values of "1" and "0".

Figure 6:
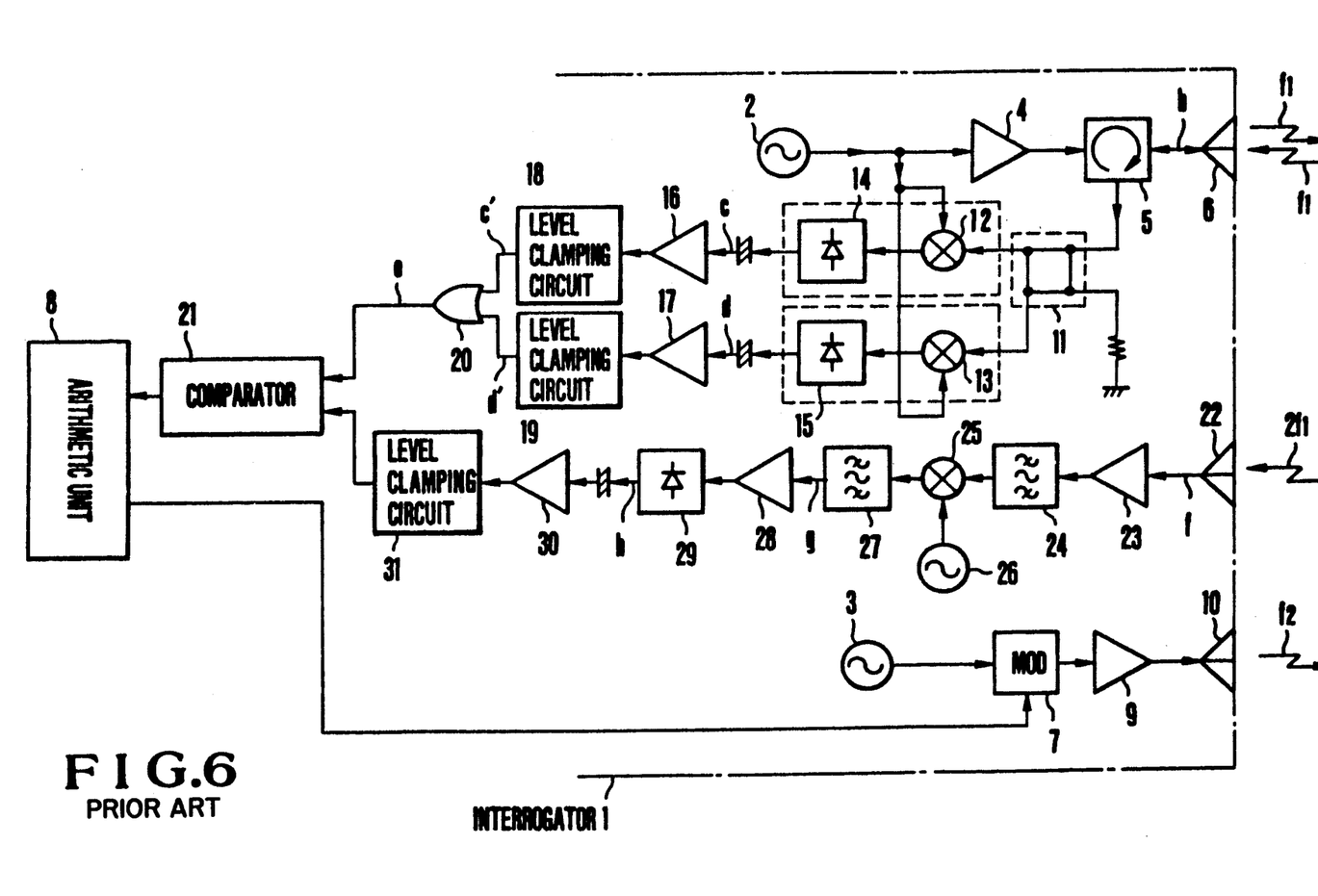
FIG. 6 is a block diagram showing an interrogator of a communication system to which a reception means of a conventional baseband signal communication apparatus is applied.
Figure 7:
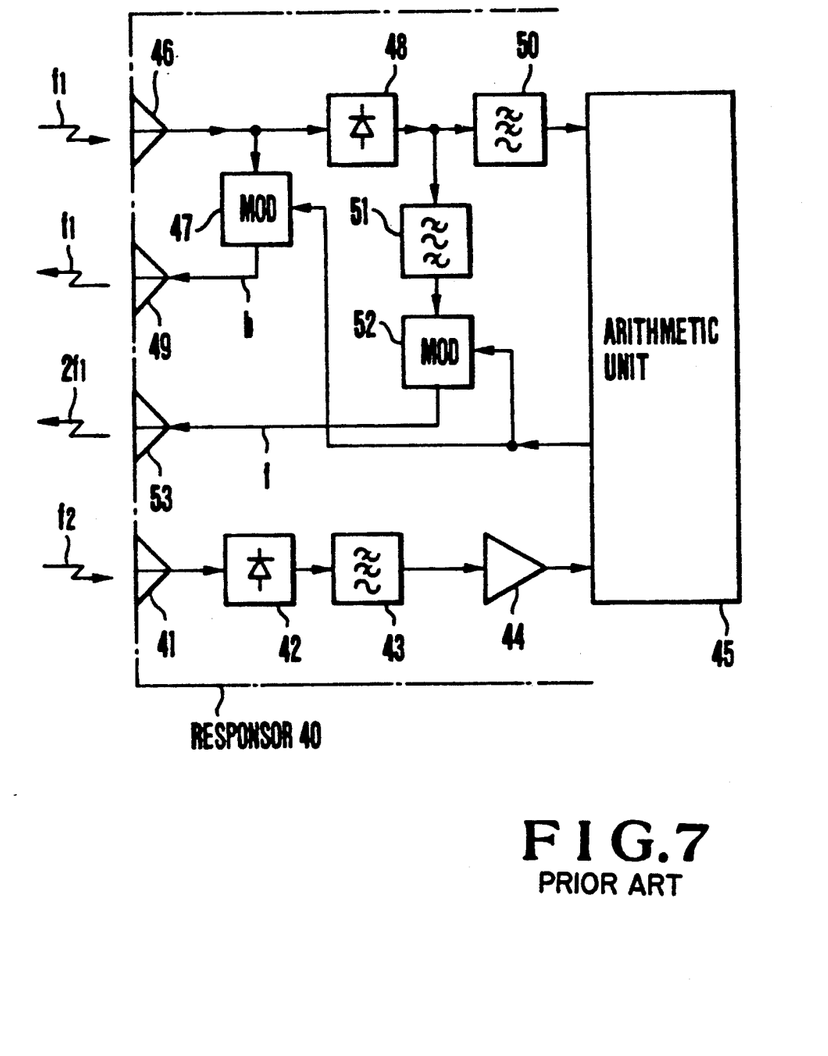
FIG. 7 is a block diagram showing a responsor of a communication system to which a transmission means of the conventional baseband signal communication apparatus is applied.

A conventional baseband signal communication apparatus used for the above-described communication system will be described with reference to FIGS. 6 to 9(h). FIG. 6 shows an interrogator of a communication system to which a reception means of the conventional baseband signal communication apparatus is applied. FIG. 7 shows a responsor of a communication system to which a transmission means of the conventional baseband signal communication apparatus is applied. FIGS. 8(a) to 8(e) show timing charts for explaining demodulation of a response signal wave from a first reception means in FIG. 1. FIG. 9(a) and FIGS. 9(f) to 9(h) show timing charts for explaining demodulation of a harmonic wave from a second reception means in FIG. 6.

An interrogator 1 in FIG. 6 will be described below. The interrogator 1 comprises a first oscillator 2 for generating a signal having a first frequency f1 (e.g., 2,440 MHz) in a microwave band, and a second oscillator 3 for generating a signal having a second frequency f2 (e.g., 2,455 MHz) which is slightly different from the first frequency f1. The signal having the first frequency f1 output from the first oscillator 2 is amplified by an amplifier 4. The amplified signal is then transmitted, as, e.g., a vertically-polarized energy wave, from an antenna 6 to a responsor (to be described later) through a circulator 5 without modulation. The signal having the second frequency f2 output from the second oscillator 3 is A1-modulated by a modulator 7 with an interrogation signal output from an arithmetic unit 8, and is amplified by an amplifier 9. The amplified signal is then transmitted, as an interrogation signal wave, from an antenna 10 to the responsor upon horizontal polarization.

Upon reception of the energy wave and the interrogation signal wave, the responsor (to be described later) transmits a response signal and a harmonic wave to the interrogator 1. The response signal is obtained as a first transmission signal wave by phase-modulating a carrier for the signal having the first frequency f1 with a response signal corresponding to the interrogation signal. The harmonic wave is obtained as a second transmission signal wave by amplitude-modulating a carrier for a second harmonic wave of the signal having the first frequency f1.

In the interrogator 1, the response signal wave is received by the antenna 6 and is supplied to a phase shifter 11 through the circulator 5. The response signal is branched by the phase shifter 11 into two signals whose carriers have a phase difference of 90°. The two signals are respectively supplied to mixing circuits 12 and 13. Portions of the signal having the first frequency f1 from the first oscillator 2 are respectively supplied in phase, as detection carriers, to the mixing circuits 12 and 13. The mixing circuits 12 and 13 then output signals which are amplitude-modulated in accordance with a phase difference between the response signal wave and each detection carrier. The envelopes of the amplitude-modulated signals are detected by detectors 14 and 15, and baseband demodulated signals are respectively obtained as homodyne detection outputs. In addition, these demodulated outputs are amplified by amplifiers 16 and 17. The amplifiers 16 and 17 discriminate binary output levels of the demodulated signals as the baseband demodulated signals, and invert/output them if they have opposite phases. Level matching of the outputs from the amplifiers 16 and 17 is performed by level clamping circuits 18 and 19. The outputs are then supplied to an OR circuit 20. An OR output from the OR circuit 20 is supplied, as a first base band modulated signal, to a comparator 21. The mixing circuit 12 and the detector 14 constitute one homodyne detector as a demodulator, whereas the mixing circuit 13 and the detector 15 constitute the other homodyne detector as a demodulator. The antenna 6, the phase shifter 11, the two homodyne detectors, the amplifiers 16 and 17, the level clamping circuits 18 and 19, and the OR circuit 20 constitute the first reception means for receiving a phase-modulated response signal wave and outputting a first baseband demodulated signal.

The harmonic wave is received by an antenna 22 and is amplified by an amplifier 23. A second harmonic wave 2f1 (e.g., 4,880 MHz) of the signal having the first frequency f1 is extracted by a bandpass filter 24, and is supplied to a mixing circuit 25. The mixing circuit 25 receives a signal having a third frequency (e.g., 4,940 MHz) from a third oscillator 26. Frequency conversion is then performed by the mixing circuit 25 and an intermediate frequency signal (e.g., 60 MHz) is extracted by a bandpass filter 27. The intermediate frequency signal is amplified by an amplifier 28, and its envelope is detected by a detector 29, thus obtaining a baseband modulated signal. The detection output from the detector 29 is amplified by an amplifier 30, and is subjected to level matching in a level clamping circuit 31. The obtained signal is then supplied, as a second baseband demodulated signal, to the comparator 21. The antenna 22, the amplifiers 23, 28, and 30, the bandpass filters 24 and 27, the mixing circuit 25, the third oscillator 26, the detector 29, and the level clamping circuit 31 constitute the second reception means for receiving an amplitude-modulated harmonic wave and outputting a second baseband demodulated signal. The mixing circuit 25 and the detector 29 constitute a demodulator.

The comparator 21 compares the first baseband demodulated signal demodulated by the first reception means using the response signal wave with the second baseband demodulated signal demodulated by the second reception means using the harmonic wave. If they coincide with each other, the comparator 21 supplies either or the sum of the first and second baseband demodulated signals, as a demodulated signal of a baseband signal serving as a response signal, to the arithmetic unit 8. If they do not coincide with each other, the comparator 21 supplies an error signal to the arithmetic unit 8.

A responsor 40 in FIG. 7 will be described below. In the responsor 40, an interrogation signal wave from the interrogator 1 is received by an antenna 41, and is converted into an interrogation signal by a detector 42 and a low-pass filter 43. The signal is then amplified by an amplifier 44 and is supplied to an arithmetic unit 45. In addition, an energy wave from the interrogator 1 is received by an antenna 46 and is supplied to a phase modulator 47 and a rectifier 48. A carrier supplied to the phase modulator 47 is phase-modulated by a response signal output which is output from the arithmetic unit 45 in accordance with the interrogation signal, and a response signal wave as a first transmission signal wave is transmitted from an antenna 49 to the interrogator 1. The energy wave supplied to the rectifier 48 is converted into a DC operation power through a low-pass filter 50 and is supplied, as a driving power source, to the arithmetic unit 45 and the like. Upon rectification of the rectifier 48, harmonic components are generated, and a second harmonic wave is extracted by a bandpass filter 51. The second harmonic wave is then supplied, as a carrier, to an amplitude modulator 52. The second harmonic wave is amplitude-modulated by the amplitude modulator 52 in accordance with the response signal output from the arithmetic unit 45, and is transmitted, as a second transmission signal wave, from an antenna 53 to the interrogator 1.

Figure 8:
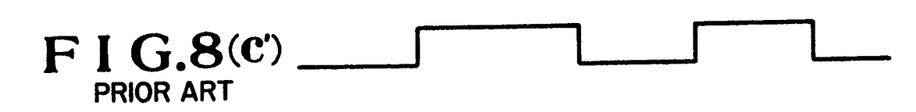
Figure 8A:
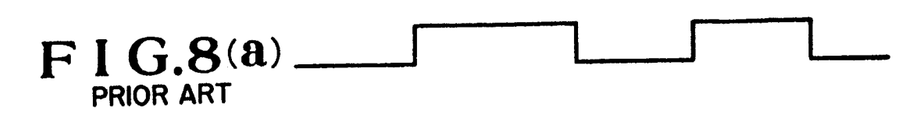
Figure 8B:
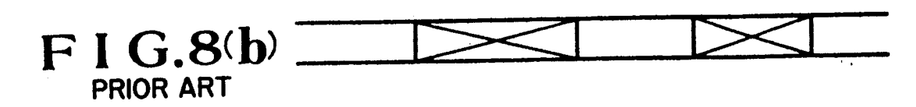
Figure 8C:
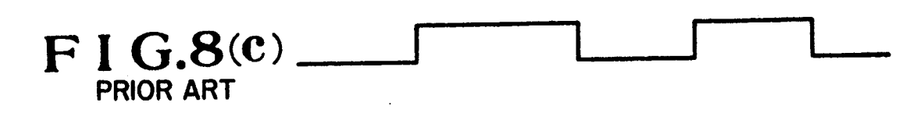
Figure 8D:
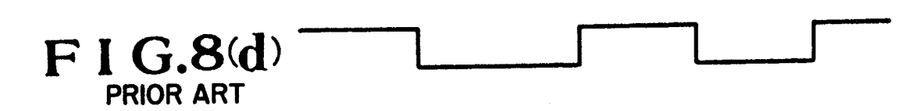
Figure 8E:
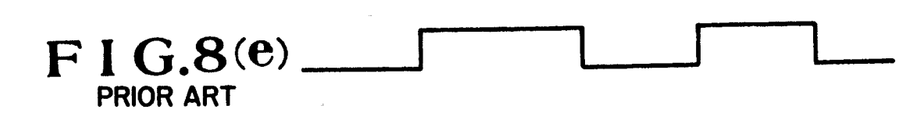

In this arrangement, if a baseband signal as a response signal is represented by a waveform shown in FIG. 8(a), a carrier for an output from the phase modulator 47 is phase-shifted for one binary value but is not phase-shifted for the other value, as shown in FIG. 8(b). Upon reception of the response signal wave shown in FIG. 8(b), the first reception means of the interrogator 1 outputs first demodulated signals shown in FIGS. 8(c) and 8(d) by homodyne detection. If the baseband signal has a proper binary output level as shown in FIG. 8(c), it can be amplified as it is by the amplifier 16 as shown in FIG. 8(c'). If the output level has the opposite level as shown in FIG. 8(d), the baseband signal is inverted and amplified by the amplifier 17 as shown in FIG. 8(d'). In addition, the OR of the outputs from the amplifiers 16 and 17 is output, as a first baseband demodulated signal, from the OR circuit, as shown in FIG. 8(e).

Figure 9A:
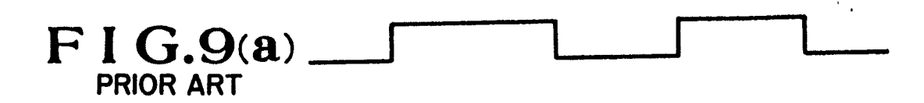
Figure 9F:
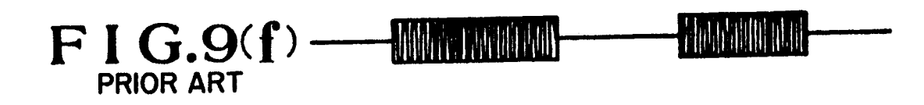
Figure 9G:
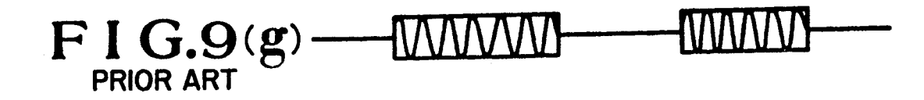
Figure 9H:
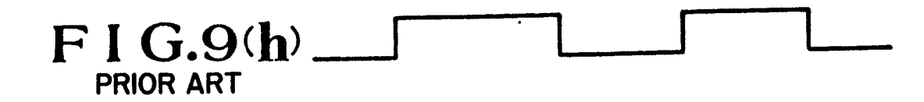

In the output from the amplitude modulator 52, a second harmonic wave is output for one binary value and no output for the other binary value, as shown in FIG. 9(f). Upon reception of the harmonic wave shown in FIG. 9(f), the second reception means of the interrogator 1 outputs an intermediate frequency signal by frequency conversion, as shown in FIG. 9(g). In addition, an envelope detection output is output, as a second baseband modulated signal, from the detector 29, as shown in FIG. 9(h).

If the comparator 21 determines that the first and second baseband demodulated signals, which are transmitted from the first and second reception means with different carriers and by different modulation methods, coincide with each other, it is determined communication is properly performed. As a result, either or the sum of the first and second baseband demodulated signals is used, as a demodulated signal of the baseband signal serving as the response signal, in the arithmetic unit 8.

In the above-described communication system, a response signal wave transmitted from the responsor 40 to the interrogator 1 has a very weak electric field strength. For this reason, a response signal wave is susceptible to amplitude modulation due to a low-frequency electromagnetic wave having a frequency of 50 or 60 Hz generated by a fluorescent lamp located near the responsor 40. In addition, if the responsor 40 is moved, a carrier for a response signal received by the interrogator 1 is slightly frequency-modulated due to a Doppler effect. For this reason, a homodyne detection output as a first demodulated signal obtained by the first reception means of the interrogator 1 is equivalent to a baseband demodulated signal as a response signal on which low-frequency noise is superposed due to the above-mentioned amplitude modulation or frequency modulation. In order to decode the baseband demodulated signal, therefore, a certain circuit means for removing this low-frequency noise is required, resulting in a complicated circuit arrangement. In addition, decoding errors tend to occur.

Furthermore, the binary output level of a homodyne detection output of a response signal wave is inverted depending on the distance from the interrogator 1 to the responsor 40. Therefore, a circuit means for inverting a homodyne detection output depending on its binary output level is required. This complicates a circuit arrangement for decoding.

Moreover, in the first reception means, since the bandwidth of each of the amplifiers 16 and 17 is set to be wide in order to amplify a homodyne detection output having the same waveform as that of a baseband signal without distortion, it is difficult to realize a circuit arrangement which can increase the S/N ratio.

Similarly, in the second reception means, in association with a demodulating operation for obtaining a second baseband demodulated signal as a response signal from a harmonic wave, the bandwidth of the amplifier 30 is set to be wide in order to amplify an envelope detection output having the same waveform as that of a baseband signal without distortion. Therefore, it is difficult to realize a circuit arrangement which can increase the S/N ratio.

Especially, in a responsor having no operating power source, which is designed to externally receive a wave having a microfrequency or the like as an energy wave and to obtain an operation power source by converting the wave into a DC power, a response signal is transmitted with a weak electric field strength. Therefore, it is difficult to receive and demodulate a response signal at a high S/N ratio.

SUMMARY OF THE INVENTION

The present invention has been made in consideration of the above situation, and has as its object to provide a baseband signal communication apparatus which can demodulate a baseband signal at a high S/N ratio with a simple, low-cost circuit arrangement.

It is another object of the present invention to provide a baseband signal communication apparatus which can accurately demodulate baseband signals having the same phases and allows confirmation of proper reception of baseband signals so as to improve reliability in communication.

In order to achieve the above objects, according to the present invention, there is provided a baseband signal communication apparatus comprising transmission means for superposing a subcarrier on one value of a baseband signal consisting of binary values, modulating a carrier with the baseband signal on which the subcarrier is superposed, and transmitting the baseband signal as a transmission signal wave, and reception means for demodulating the baseband signal having the subcarrier superposed thereon by using a demodulator upon reception of the transmission signal wave, extracting the subcarrier from the demodulated signal by using a bandpass filter, and demodulating the baseband signal by causing a detector to detect an envelope of the subcarrier.

According to the present invention, since a baseband signal is transmitted upon superposion of a subcarrier on one value thereof, and the subcarrier is extracted from the demodulated signal by the bandpass filter in the reception means, the S/N ratio can be increased by narrowing the band of the bandpass filter.

Since the subcarrier is extracted by the bandpass filter, low-frequency noise can be removed in spite of the fact that the demodulator is of a homodyne detection system. In addition, since envelope detection of the extracted subcarrier is performed, baseband signals can be demodulated in phase in spite of the fact that homodyne detection outputs have binary opposite phases.

If frequency conversion is performed to obtain an intermediate frequency signal, and envelope detection of the intermediate frequency signal is performed, the selectivity is improved, and hence the S/N ratio is increased.

If first and second transmission signal waves which have different carriers and are subjected to different modulation schemes are demodulated by first and second reception means, and the first and second baseband demodulated signals are compared with each other by a comparing means, since the first and second transmission signal waves undergo different phasing and are subjected to different influences of external noise, it can be confirmed that the baseband signals are properly received when they coincide with each other.

If a harmonic component which is amplitude-modulated upon phase modulation of a carrier as a first transmission signal wave is received as a second transmission signal wave, two transmission signal waves which have different carriers and are subjected to different modulation schemes can be obtained with a simple circuit arrangement.

When a baseband signal is to be transmitted from a responsor to an interrogator, even if the baseband signal is transmitted from the responsor with a weak electric field strength, the signal can be received at a high S/N ratio by receiving and demodulating it by the interrogator with a simple circuit in a narrow band.

BRIEF DESCRIPTION OF THE DRAWINGS

FIG. 3(a) and FIGS. 3(i) to 3(q) are timing charts for explaining demodulation of a response signal wave in a first reception means in FIG. 1;

FIGS. 4(a), 4(i) and FIGS. 4(r) to 4(v) are timing charts for explaining demodulation of a harmonic wave in a second reception means in FIG. 1;

FIGS. 8(a) to 8(e) are timing charts for explaining demodulation of a response signal wave in a first reception means in FIG. 6; and FIG. 9(a) and FIGS. 9(f) to 9(h) are timing charts for explaining demodulation of a harmonic wave in a second reception means in FIG. 6.

DETAILED DESCRIPTION OF THE PREFERRED EMBODIMENTS

Figure 1:
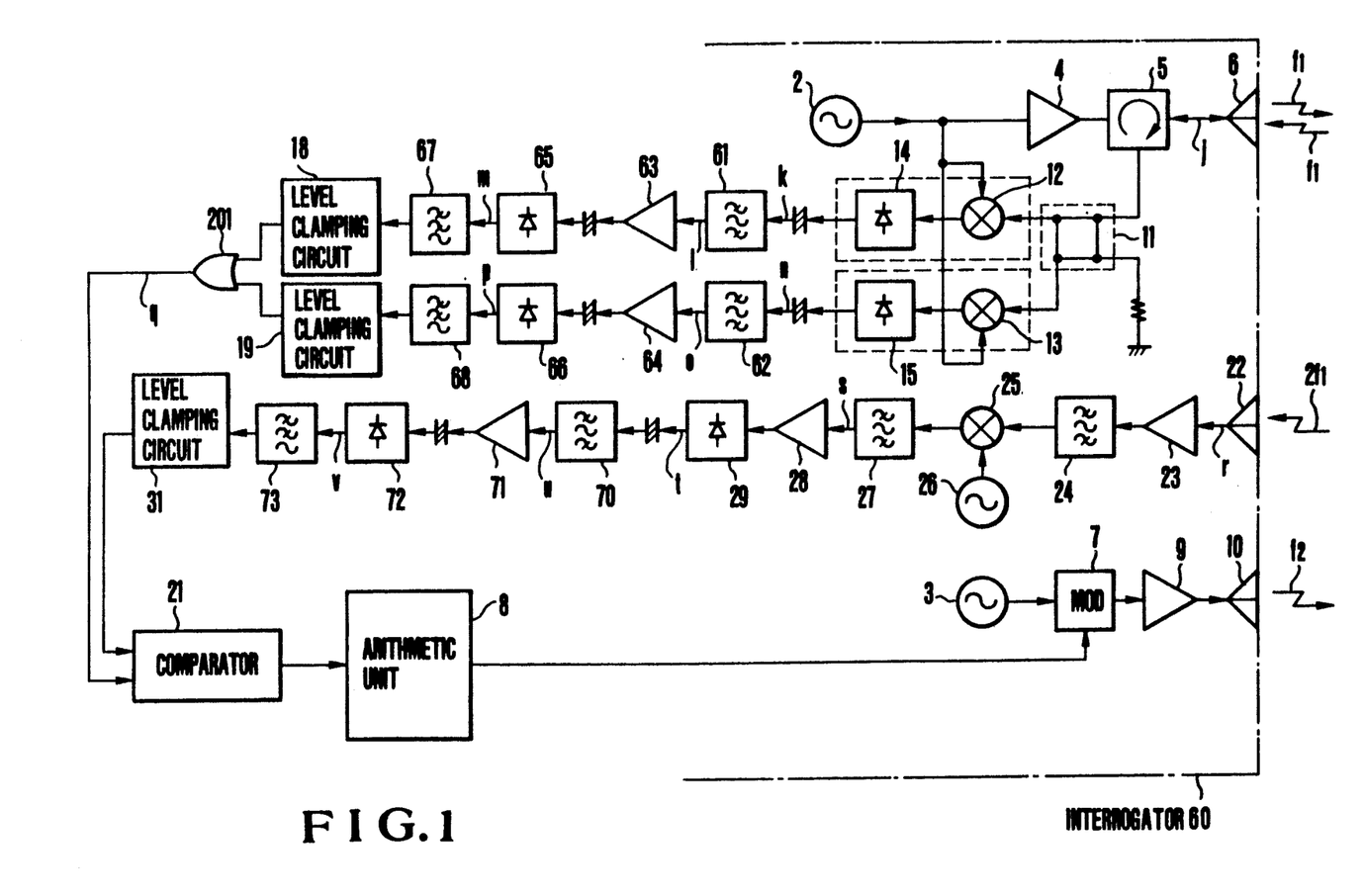
FIG. 1 is a block diagram showing an interrogator of a communication system to which a reception means, as an embodiment, of a baseband signal communication apparatus of the present invention is applied.
Figure 2:
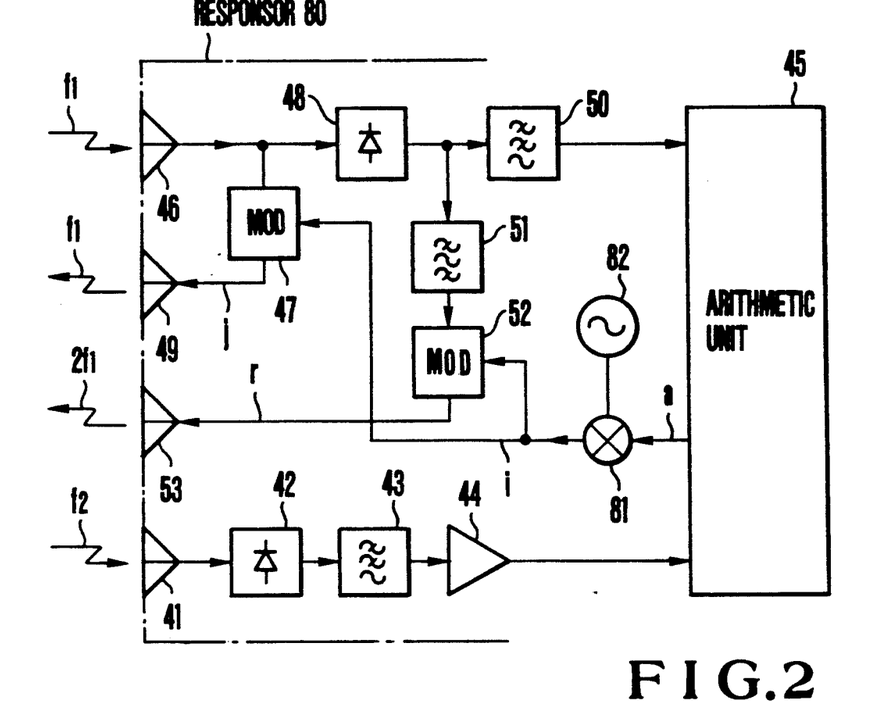
FIG. 2 is a block diagram showing a responsor of a communication system to which a transmission means, as an embodiment, of the baseband signal communication apparatus of the present invention is applied.

Embodiments of the present invention will be described below with reference to FIGS. 1 to 4. FIG. 1 shows an interrogator of a communication system to which a reception means, as an embodiment, of a baseband signal communication apparatus of the present invention is applied. FIG. 2 shows a responsor of a communication system to which a transmission means, as an embodiment, of the baseband signal communication apparatus of the present invention is applied. FIG. 3(a) and FIGS. 3(i) to 3(q) show timing charts for explaining demodulation of a response signal wave in a first reception means in FIG. 1. FIGS. 4(a), 4(i) and FIGS. 4(r) to 4(v) show timing charts for explaining demodulation of a harmonic wave in a second reception means in FIG. 1. The same reference numerals in FIGS. 1 and 2 denote the same parts as in FIGS. 6 and 7, and a description thereof will be omitted.

An interrogator 60 in FIG. 1 will be described below. In the first reception means included in the interrogator 60 and designed to demodulate a response signal wave, homodyne detection outputs as first demodulated signals output from detectors 14 and 15 are respectively supplied to bandpass filters 61 and 62 (to be described later) for extracting only subcarriers. The extracted subcarriers are respectively amplified by amplifiers 63 and 64 and are supplied to detectors 65 and 66. The subcarriers are subjected to envelope detection in the detectors 65 and 66 so as to be demodulated. In addition, these demodulated signals are respectively supplied to level clamping circuits 18 and 19 through low-pass filters 67 and 68. Then, a first baseband demodulated signal is output from an OR circuit 20.

In the second reception means included in the interrogator 60 and designed to demodulate a harmonic wave, an envelope detection output as a second demodulated signal output from a detector 29 is supplied to a bandpass filter 70 for extracting only a subcarrier. The extracted subcarrier is amplified by an amplifier 71, and is subjected to envelope detection in a detector 72 so as to be demodulated. This demodulated signal as a second baseband demodulated signal is supplied to a level clamping circuit 31 through a low-pass filter 73.

A responsor 80 in FIG. 2 will be described below. In the responsor 80, a response signal output from an arithmetic unit 45 is supplied to a mixing circuit 81. A subcarrier is supplied from a subcarrier oscillator 82 to the mixing circuit 81 and is superposed on one of the binary values of a baseband signal of the response signal. The baseband signal on which the subcarrier is superposed is supplied to a phase modulator 47 and an amplitude modulator 52. As a result, the response signal which is phase-modulated by the baseband signal having the subcarrier superposed thereon is transmitted, as a first transmission signal wave, from an antenna 49 to the interrogator 60 by using a signal having a first frequency f1 as a carrier. At the same time, the harmonic wave which is amplitude-modulated by the baseband signal having the subcarrier superposed thereon is transmitted, as a second transmission signal wave, from an antenna 53 to the interrogator 60 by using a second harmonic wave 2f1 having the first frequency f1 as a carrier. Note that the subcarrier oscillator 82 may use a clock from the arithmetic unit 45 by proper frequency division, or may use an energy wave received by an antenna 46 by properly frequency-dividing the first frequency f1.

Figure 3A:
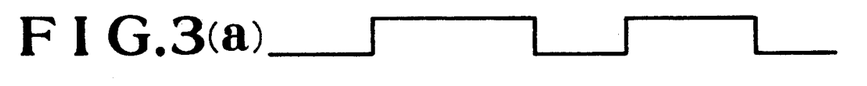
Figure 3I:
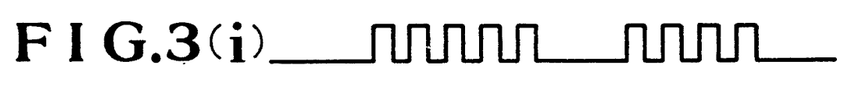
Figure 3J:
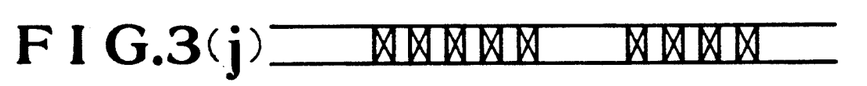
Figure 3K:
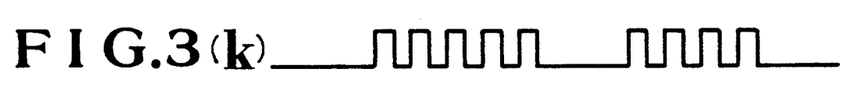
Figure 3L:
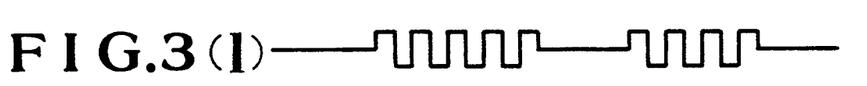
Figure 3M:
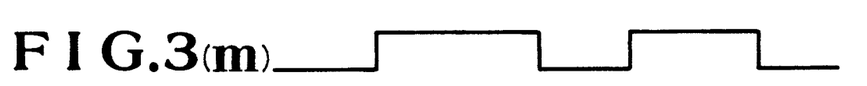
Figure 3N:
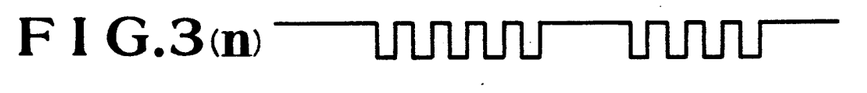
Figure 3O:
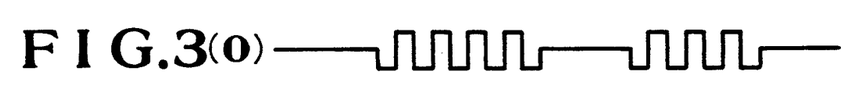
Figure 3P:
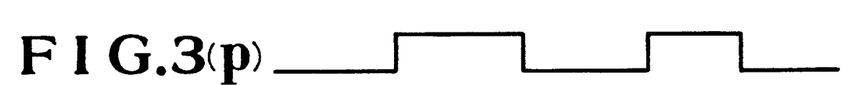
Figure 3Q:
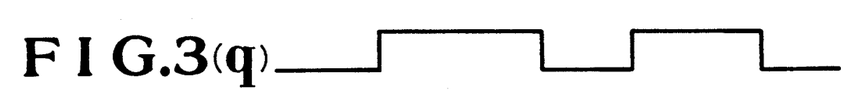

In this arrangement, if a baseband signal as a response signal is represented by a waveform shown in FIG. 3(a), a baseband signal on which a subcarrier is superposed is given as shown in FIG. 3(i). FIG. 3(j) shows a response signal wave phase-modulated by the baseband signal on which the subcarrier is superposed. Upon reception of the response signal wave shown in FIG. 3(j), the first reception means of the interrogator 60 outputs first modulated signals shown in FIGS. 3(k) and 3(n) upon homodyne detection. The bandpass filters 61 and 62 extract subcarriers shown in FIGS. 3(l) and 3(o) from the first modulated signals. The first modulated signals are then subjected to envelope detection in the detectors 65 and 66. As a result, signals shown in FIGS. 3(m) and 3(p) are output. In addition, the OR of the detection outputs from the detectors 65 and 66 is output from the OR circuit 20 as a first baseband demodulated signal obtained by demodulating the response signal, as shown in FIG. 3(q). If a homodyne detection output has the opposite phase as shown in FIG. 3(n), the leading and trailing edges of the detection output (shown in FIG. 3(p)) from the detector 66 are shifted from the detection output (shown in FIG. 3(m)) from the detector 65 by, strictly speaking, ½ the period of the subcarrier. In practice, however, such a detection output can be processed as an output with no shift by properly setting the frequency of the subcarrier.

Figure 4A:
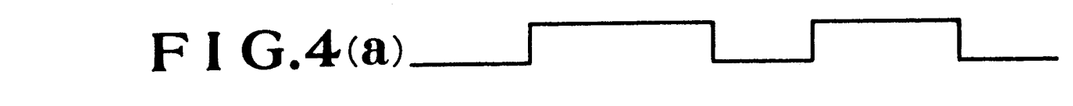
Figure 4I:
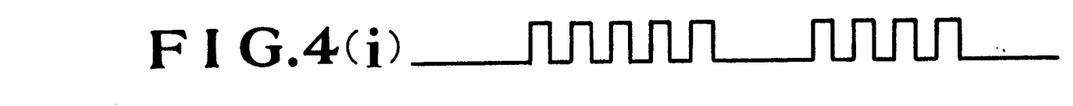
Figure 4R:
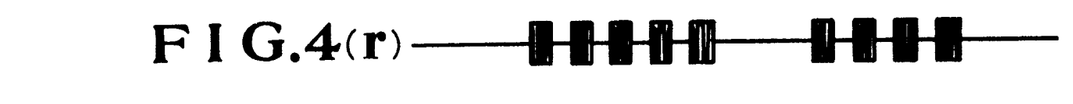
Figure 4S:
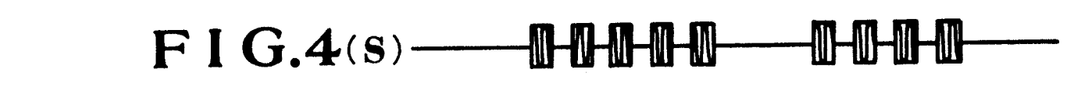
Figure 4T:
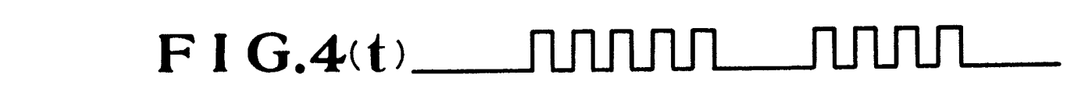
Figure 4U:
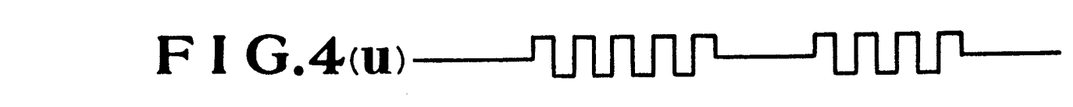
Figure 4V:
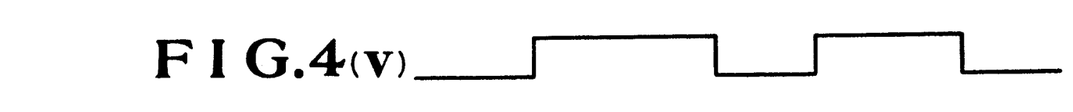

In the output from the amplitude modulator 52, as shown in FIG. 4(r), a second harmonic wave is output during one binary value at the period of the subcarrier, and a harmonic wave as a second transmission signal wave is transmitted from the antenna 53. Upon reception of the harmonic wave shown in FIG. 4(r), the second reception means of the interrogator 60 outputs an intermediate frequency signal at the period of the subcarrier, as shown in FIG. 4(s). The intermediate frequency signal is then subjected to envelope detection in the detector 29. As a result, a baseband signal on which the subcarrier is superposed is demodulated, as shown in FIG. 4(t). The bandpass filter 70 extracts only the subcarrier from the baseband signal on which the subcarrier is superposed, as shown in FIG. 4(u). When envelope detection of the baseband signal is performed by the detector 72, the baseband signal is output as a second baseband demodulated signal obtained by demodulating the response signal, as shown in FIG. 4(v).

Figure 5:
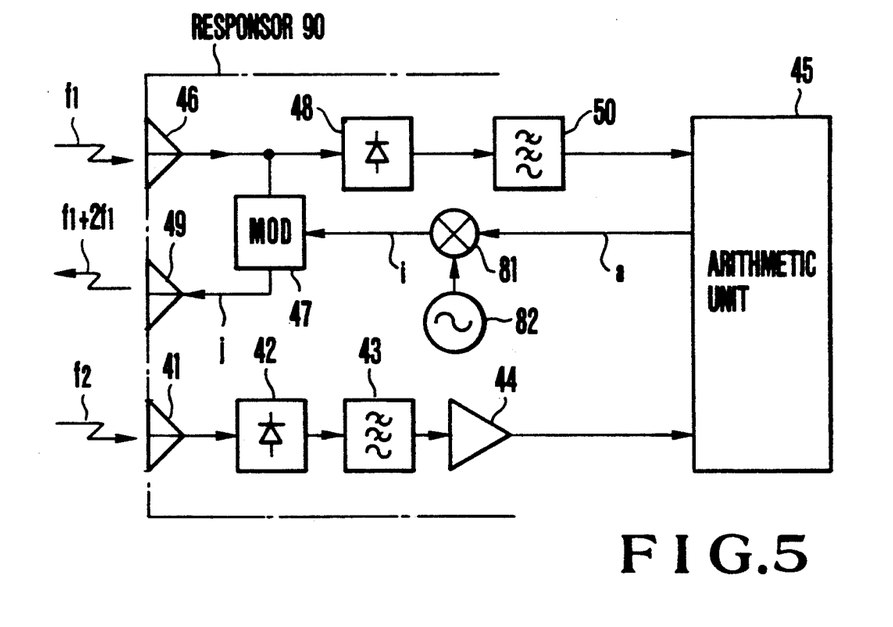
FIG. 5 is a block diagram showing a responsor of a communication system to which a transmission, as another embodiment, of the baseband signal communication apparatus of the present invention is applied.

FIG. 5 shows a responsor of a communication system to which a transmission means, as another embodiment, of the baseband signal communication apparatus of the present invention is applied. The same reference numerals in FIG. 5 denote the same parts as in FIGS. 2 and 7, and a description thereof will be omitted.

Referring to FIG. 5, a baseband signal on which a subcarrier is superposed is supplied to only a phase modulator 47, and components equivalent to the amplitude modulator 52 and the like shown in FIG. 2 are omitted. The phase modulator 47 is constituted by a variable capacitance diode and the like, and is designed to generate a harmonic component which is apparently amplitude-modulated due to changes in capacitance in phase modulation. This harmonic component is radiated, as a harmonic wave, from an antenna 49 together with a response signal.

With this arrangement, no specifical circuit for amplitude-modulating a harmonic component need be arranged, and the circuit arrangement can be simplified accordingly.

A circuit arrangement for superposing a subcarrier on a baseband signal during an interval of one binary value is not limited to the one using the mixing circuit 81 in the above-described embodiment. For example, a circuit arrangement for AI-modulating a subcarrier with a baseband signal may be employed. In the above-described embodiment, in order to more accurately transmit and receive a baseband signal as a response signal, the first and second transmission signal waves as a response signal wave and a harmonic wave are used, and the first and second reception means are arranged. However, only one of the reception means may be used. Furthermore, in the first reception means for demodulating a response signal wave, it is apparent that one homodyne detector can be used as long as the phase of a detection carrier or a carrier for a response signal wave is properly adjusted, and a proper homodyne detection output can be obtained regardless of the distance from the interrogator to the responsor 80 or 90. Furthermore, the carriers for the first and second transmission signal waves need not have a relationship between a fundamental wave and its harmonic component as long as they are different from each other.

Since the baseband signal communication apparatus of the present invention has the above-described arrangement, the following effects can be obtained.

In the baseband signal communication apparatus according to the first aspect of the present invention, since a subcarrier is extracted by a bandpass filter, the S/N ratio can be increased by narrowing the band of the bandpass filter. In addition, the band of the bandpass filter can be narrowed with a very simple circuit arrangement.

In the baseband signal communication apparatus according to the second aspect of the present invention, low-frequency noise can be removed with a simple circuit arrangement in spite of homodyne detection, and baseband signals having the same phase can be accurately demodulated by envelope detection of subcarriers regardless of the opposite phases of homodyne detection outputs and the like.

In the baseband signal communication apparatus according to the third aspect of the present invention, the selectivity is improved due to frequency conversion, and the S/N ratio can be greatly increased with a narrow band of the bandpass filter.

In the baseband signal communication apparatus according to the forth aspect of the present invention, since the first and second transmission signal waves have different carriers and are subjected to different modulation schemes, they are subjected to different phasing and differently influenced by external noise in the transmission paths. Therefore, if the first and second baseband demodulated signals obtained from the two transmission signal waves coincide with each other, it can be confirmed that a baseband signal is properly received, thus increasing communication reliability.

In the baseband signal communication apparatus according to the fifth aspect of the present invention, since harmonic components generated upon phase modulation are positively used, two carriers can be obtained with a very simple circuit arrangement, and highly reliable communication can be performed even with a low-cost circuit arrangement.

In the baseband signal communication apparatus according to the sixth aspect of the present invention, although a baseband signal is transmitted from a responsor carried by a user or attached to a moving object to an interrogator with a weak electric field strength, the interrogator can receive/demodulate the baseband signal at a high S/N ratio. For this reason, the baseband signal communication apparatus of the present invention is suitable for a communication system including a responsor which has no operating power source and is designed to perform transmission by obtaining an operation power from an external signal having a microfrequency or the like.

What is claimed is:

1. A baseband signal communication apparatus comprising:
    first transmission means for superposing a subcarrier on one value of a baseband signal consisting of binary values, phase-modulating a first carrier with the baseband signal on which the subcarrier is superposed, and transmitting the baseband signal as a first transmission signal wave;
    second transmission means for amplitude-modulating a second carrier with the baseband signal on which the subcarrier is superposed, and transmitting the baseband signal as a second transmission signal wave;
    first reception means for receiving the first transmission signal wave, detecting the first transmission signal wave by using a homodyne detector so as to obtain a first demodulated signal, extracting the subcarrier from the first demodulated signal by using a first bandpass filter, and obtaining a first baseband demodulated signal by detecting an envelope of the subcarrier by using a first detector;
    second reception means for receiving the second transmission signal, frequency-converting the second transmission signal by using a frequency converter so as to obtain an intermediate frequency signal, detecting an envelope of the intermediate frequency signal by using a second detector so as to obtain a second demodulated signal, extracting the subcarrier from the second demodulated signal by using a second bandpass filter, and detecting an envelope of the subcarrier by using a third detector so as to obtain a second baseband signal demodulated signal; and
    comparing means for comparing the first and second baseband demodulated signals, and outputting at least one of the first and second baseband demodulated signals as a demodulated signal of the baseband signal when the first and second baseband demodulated signals coincide with each other.

2. A baseband signal communication apparatus comprising:
    transmission means for superposing a subcarrier on one value of a baseband signal consisting of binary values, phase-modulating a carrier wave with the baseband signal on which the subcarrier is superposed, and transmitting the baseband signal as a transmission signal wave;
    first reception means for receiving the transmission signal wave, performing homodyne detection of the transmission signal wave by using a homodyne detector so as to obtain a first demodulated signal, extracting the subcarrier from the first demodulated signal by using a first bandpass filter, and detecting an envelope of the subcarrier by using a first detector so as to obtain a first baseband demodulated signal;
    second reception means for receiving a harmonic wave which is amplitude-modulated by the baseband signal having the subcarrier superposed thereon and radiated upon phase modulation in said transmission means, frequency-converting the harmonic wave by using a frequency converter so as to obtain an intermediate frequency signal, detecting an envelope of the intermediate frequency signal by using a second detector, extracting the subcarrier from the second demodulated signal by using a second bandpass filter, and detecting an envelope of the subcarrier by using a third detector so as to obtain a second baseband demodulated signal; and
    comparing means for comparing the first and second baseband demodulated signals, and outputting at least one of the first and second baseband demodulated signals as a demodulated signal of the baseband signal when the first and second demodulated signals coincide with each other.

3. An apparatus according to any one of claim 1 or 2 wherein in a communication system in which an interrogation signal is transmitted from an interrogator to a responsor, and a response signal corresponding to the received and demodulated interrogation signal is transmitted from said responsor to said interrogator, the baseband signal as the response signal on which the subcarrier is superposed is transmitted from said responsor to said interrogator.

* * * * *